UNITED STATES PATENT OFFICE.

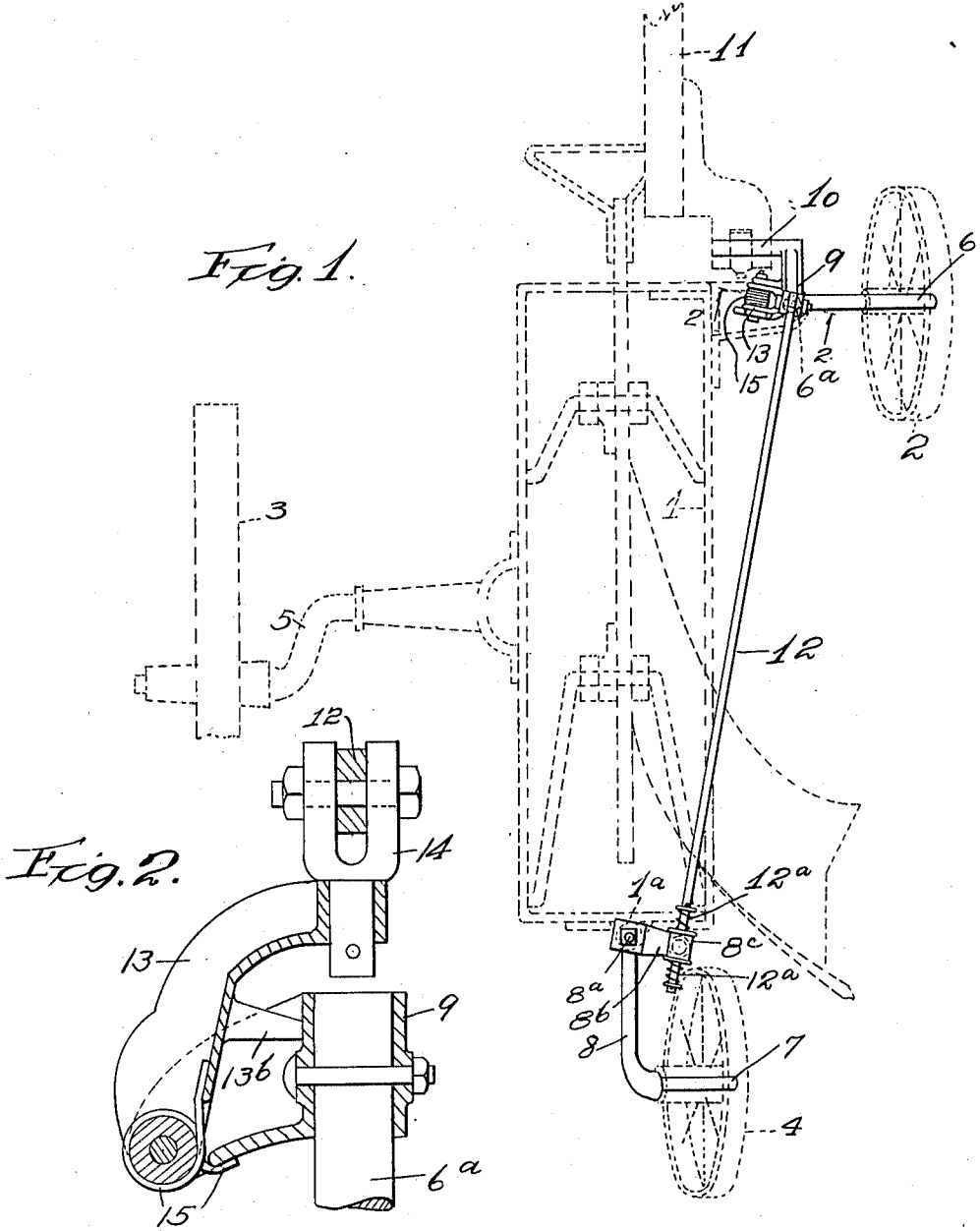

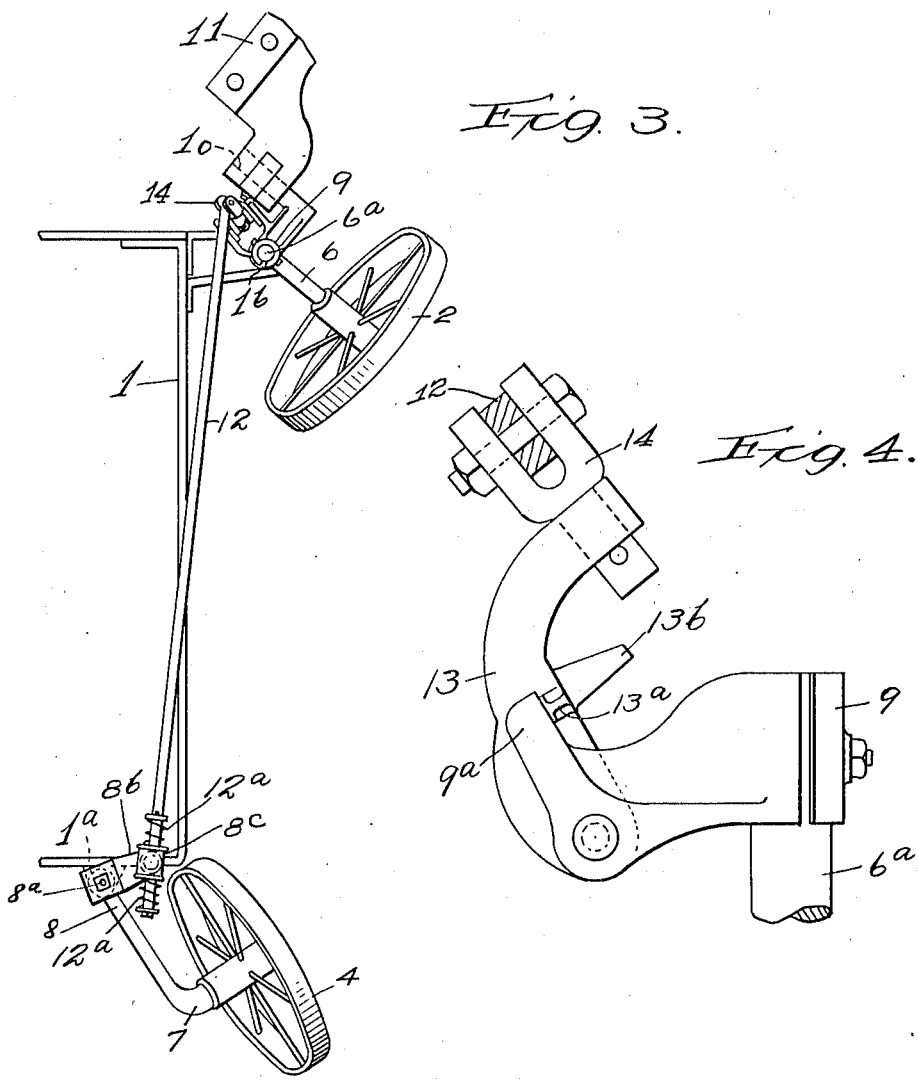

WINFIELD SCOTT NICHOLS, OF PLANO, ILLINOIS, ASSIGNOR TO INDEPENDENT HARVESTER COMPANY, OF PLANO, ILLINOIS, A CORPORATION OF ILLINOIS.

CASTER-CONTROLLER FOR WHEEL-PLOWS.

1,099,195.  Specification of Letters Patent.  Patented June 9, 1914.

Application filed June 27, 1913. Serial No. 776,040.

*To all whom it may concern:*

Be it known that I, WINFIELD SCOTT NICHOLS, a citizen of the United States, residing at Plano, in the county of Cook and State of Illinois, have invented new and useful Improvements in Caster-Controllers for Wheel-Plows, of which the following is a specification, reference being had to the accompanying drawings, forming a part thereof.

This invention relates to means for controlling the rear caster wheels of wheel plows.

It consists in the features and elements described and shown in the drawings as indicated by the claims.

In the drawings:—Figure 1 is a plan view of a wheel plow showing the general outlines of the plow in dotted lines and in full lines the features embodying this invention. Fig. 2 is an enlarged detail section of the steering bracket taken as indicated at line 2—2 on Fig. 1. Fig. 3 is a detail plan view of the caster controlling device with the steering and caster wheels in position for traversing a curved path. Fig. 4 is an enlarged detail view, being a rear elevation of the steering bracket with the rocker arm in the same position as in Fig. 3.

The plow frame, 1, illustrated in Fig. 1, is of the usual type supported on three wheels, viz., the front steering wheel, 2, a side wheel, 3, and a rear caster wheel, 4. The side wheel, 3, is journaled on an axle, 5, fixed with respect to the frame, 1, while the front and rear wheels, 2 and 4, are carried upon short axles, 6 and 7, respectively, which are pivotally connected with the frame in order to permit the plow to be steered around curves as well as in a straight path. The caster wheel axle, 7, is a short arm jutting from the caster wheel bracket, 8, which comprises a vertical stem, $8^a$, journaled in a sleeve, $1^a$, at the rear end of the frame, 1. The steering wheel axle, 6, is a similar extension of a vertical post, $6^a$, mounted in a sleeve, $1^b$, at one side of the frame at its forward end. Above this sleeve there is secured to the post, $6^a$, the steering bracket, 9, carrying a rock shaft, 10, to which the tongue, 11, is connected so as to swing in a vertical plane in the usual manner.

If the caster wheel, 4, were a mere trailer it would be too much influenced by irregularities, stones or soft places in the furrow which it was following, and would thus tend to give the entire plow frame a wabbling motion from side to side which would destroy the straightness of the furrow, and it is the purpose of the caster controlling mechanism about to be described to prevent this undue wabbling of the caster wheel while permitting it to swing upon its stem, $8^a$, whenever the plow is being steered around a curved path. For this purpose there extends from the stem, $8^a$, a radius arm, $8^b$, which is coupled by a reach rod, 12, to the controlling mechanism mounted on the steering bracket, 9. This mechanism comprises a rocker arm, 13, mounted to swing in a substantially vertical plane about an axis which in the normal straight-ahead position of the steering wheel, 2, is approximately parallel to the reach rod, 12. The upper end of the rocker, 13, overhangs the post, $6^a$, and the forward end of the reach rod, 12, is here coupled to the rocker, 13, by a swivel, 14, whose vertical axis coincides with that of the post, $6^a$, so as to permit the said post and the steering bracket to turn freely in the sleeve, $1^b$, without moving or straining the reach rod, 12. It will now be observed that so long as the steering wheel, 2, remains in its straight-ahead position the connection of the reach rod, 12, to the steering bracket through the rocker arm, 13, will prevent any wabbling of the trailer or caster wheel, 4; but when the post, $6^a$, is turned in the sleeve, $1^b$, for swinging the steering wheel, 2, to follow a curved path the pivot axis of the rocker arm, 13, being no longer parallel to the reach rod, 12, permits the rocker, 13, to yield to the thrust or pull of said reach rod resulting from the natural tendency of the trailing wheel, 4, to respond to the curvilinear path of the plow by swinging about the axis of the stem, $8^a$. In this manner the trailing caster wheel, 4, is locked against wabbling so long as the plow travels in a straight line, but is permitted to perform its function as a trailer wheel whenever the plow is definitely steered into a curved path by the swinging of the tongue and the steering bracket to which it is attached. In the ordinary course of plowing there is always a certain amount of side to side play of the tongue caused by the walking of the draft horses, particularly on rough ground, but since the axis of the rocker arm, 13, must be quite definitely moved out of parallel with the reach rod, 12, to render the rocker sensitive to any thrust of such reach rod, this slight side-to-side play of the tongue will not operate to free the caster wheel from its proper straight-ahead position; there is, however, no hindrance to such side-to-side play of the tongue by reason of the fact that the vertical pivot axis of the swivel, 14, by which the reach rod is connected with the rocker arm, 13, and with the steering bracket co-incides with the axis of the post, $6^a$, on which the tongue, 11, swings.

Without interfering with the freedom of action of any of the parts the present device renders it possible to plow a very straight furrow even on comparatively rough ground and at the same time to have available all the advantages of the steering and caster wheel construction in driving the plow around curves.

For connecting the reach rod, 12, to the radius arm, $8^b$, a sleeve, $8^c$, is pivoted to the arm, the rod, 12, passing through said sleeve and being engaged with it through the medium of cushion springs, $12^a$, whereby the caster wheel, 4, may yield to any serious obstacle in its path without danger of wrenching or breaking the mechanism. The forward end of the reach rod, 12, is pivotally secured in the forked end of the swivel, 14, above mentioned. The movement of the rocker arm, 13, is limited in one direction by coöperating stop lugs, $13^a$ and $9^a$, and in the other direction by an extension, $13^b$, which strikes against the bracket, 9, in the return movement of the arm. A spring, 15, is preferably coiled about the pivot of the rocker, 13, to hold it yieldingly in normal position and to return it to said normal position as the plow resumes a straight-ahead direction of travel.

I claim:—

1. In a wheel plow in combination with a frame, a steering bracket pivoted thereon and a caster wheel bracket pivotally connected thereto, a radius arm on the caster wheel bracket, a rocker arm on the steering bracket, and a reach rod connecting said arms, the pivot axis of said rocker arm being approximately parallel to said reach rod in the straight-ahead position of the steering bracket.

2. In a wheel plow, in combination with a frame, a steering bracket pivoted thereon and a caster wheel bracket pivotally connected thereto; a radius arm on the caster wheel bracket; a rocker arm on the steering bracket; a reach rod extending from said radius arm and pivotally connected to said rocker arm, the pivot axis of said rocker arm being approximately parallel to said reach rod in the straight-ahead position of the steering bracket, and the axis of the pivotal connection between the reach rod and rocker arm coinciding with the pivot axis of the steering bracket in the normal position of the rocker.

3. In a wheel plow, in combination with a frame, a steering bracket pivoted thereon and a caster wheel bracket pivotally connected thereto, a radius arm on the caster wheel bracket, a rocker arm on the steering bracket, and a reach rod connecting said arms, the pivot axis of said rocker arm being approximately parallel to said reach rod in the straight-ahead position of the steering bracket and being laterally off-set with respect to the pivot axis of said bracket, said rocker arm extending in normal position to overhang said steering bracket at the pivotal connection of the latter with the frame, and the reach rod having pivotal connection with such overhanging portion of said rocker arm such that the axis of said connection coincides with the pivot axis of the steering bracket in the normal position of the rocker.

4. In a wheel plow, in combination with a frame, a steering bracket pivoted thereon and a caster wheel bracket pivotally connected thereto; a radius arm on the caster wheel bracket; a rocker arm on the steering bracket and a reach rod connecting said arms, the pivot axis of said rocker arm being approximately parallel to said reach rod in the straight-ahead position of the steering bracket, and the connections of said reach rod with the said arms being adapted to permit rotation of the rod about its own axis with respect to one of the arms.

5. In a wheel plow, in combination with a frame, a steering bracket and a caster wheel bracket both pivotally connected thereto for swinging about approximately vertical axes; a radius arm on the caster wheel bracket; a rocker arm pivoted on the steering bracket for swinging about an approximately horizontal axis and a reach rod connecting said arms, the connection between said reach rod and one of said arms comprising an approximately horizontal pivot adapted to accommodate the rise and fall of the rod as the rocker arm swings about its horizontal axis.

6. In a wheel plow, in combination with a frame, a steering bracket and a caster wheel bracket both pivotally connected thereto for swinging about approximately vertical axes; a radius arm on the caster wheel bracket; a rocker arm pivoted on the steering bracket for swinging about an approximately horizontal axis and a reach rod connecting said arms, the connection between said reach rod and one of said arms comprising an approximately horizontal pivot adapted to accommodate the rise and fall of the rod as the rocker arm swings about its horizontal axis, and the connection between the reach rod and the other arm being adapted to permit rotation of the rod about its own axis with respect to said arm.

7. In a wheel plow, in combination with a frame, a steering bracket pivoted thereon and a caster wheel bracket pivotally connected thereto; a radius arm on the caster wheel bracket; a rocker arm on the steering bracket; a reach rod extending from said radius arm and pivotally connected to said rocker arm, the pivot axis of said reach rod in the straight-ahead position of the steering bracket, and the axis of the pivotal connection between the reach rod and rocker arm coinciding with the pivot axis of the steering bracket in the normal position of the rocker; means for yieldingly retaining said rocker arm in such normal position, and stops positioned to limit the swing of the rocker arm.

8. In a wheel plow, in combination with a frame, a steering bracket pivoted thereon and a caster wheel bracket pivotally connected thereto, a radius arm on the caster wheel bracket, a rocker arm on the steering bracket, a reach rod extending from said radius arm and pivotally connected to said rocker arm, the axis of such pivotal connection co-inciding with the pivot axis of the steering bracket in the normal position of the rocker, means for yieldingly retaining said rocker arm in such normal position, and an extending lug on the rocker dimensioned to abut the steering bracket for stopping said rocker in such normal position.

In testimony whereof I have hereunto set my hand at Plano, Illinois, this 24th day of June, 1913.

WINFIELD SCOTT NICHOLS.

Witnesses:
RICHARD O. LEITCH,
F. H. PHILLIPS.

---

Copies of this patent may be obtained for five cents each, by addressing the "Commissioner of Patents, Washington, D. C."